United States Patent
Chang et al.

(10) Patent No.: US 12,484,802 B2
(45) Date of Patent: Dec. 2, 2025

(54) BODY SHAPE ESTIMATION FROM LOCALIZER SCAN IN MAGNETIC RESONANCE MEDICAL IMAGING

(71) Applicant: Siemens Healthineers AG, Forchheim (DE)

(72) Inventors: Yao-Jen Chang, Princeton, NJ (US); Ankur Kapoor, Plainsboro, NJ (US); Birgi Tamersoy, Erlangen (DE); David Grodzki, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 130 days.

(21) Appl. No.: 18/420,080

(22) Filed: Jan. 23, 2024

(65) Prior Publication Data
US 2025/0235117 A1    Jul. 24, 2025

(51) Int. Cl.
A61B 5/055    (2006.01)
A61B 5/00     (2006.01)
G01R 33/28    (2006.01)
G06N 20/00    (2019.01)

(52) U.S. Cl.
CPC ............ A61B 5/055 (2013.01); A61B 5/0037 (2013.01); A61B 5/7275 (2013.01); G01R 33/288 (2013.01); G06N 20/00 (2019.01)

(58) Field of Classification Search
CPC ...... A61B 5/055; A61B 5/0037; G01R 33/288
See application file for complete search history.

(56) References Cited

U.S. PATENT DOCUMENTS 9,151,812 B2 * 10/2015 Blumhagen .......... G01R 33/288
2025/0093436 A1 * 3/2025 He ...................... G01R 33/543

FOREIGN PATENT DOCUMENTS

EP    3363357 A1 * 8/2018 ......... G01R 33/4808

OTHER PUBLICATIONS

Mescheder, Lars, et al. "Occupancy networks: Learning 3d reconstruction in function space." Proceedings of the IEEE/ CVF conference on computer vision and pattern recognition. 2019. pp. 4460-4470.
Park, Jeong Joon, et al. "Deepsdf: Learning continuous signed distance functions for shape representation." Proceedings of the IEEE/CVF conference on computer vision and pattern recognition. 2019.
Sitzmann, Vincent, et al. "Metasdf: Meta-learning signed distance functions." Advances in Neural Information Processing Systems 33 (2020): 10136-10147.

* cited by examiner

*Primary Examiner* — Colin T. Sakamoto (57) ABSTRACT

In magnetic resonance imaging, shape estimation is used to limit patient burns. A localizer image or scout scan is used to determine some of the patient shape and corresponding position. A missing part, such as the arm not in the scout scan field of view, is inferred from the localizer image. The position of the inferred body part is used to predict the risk of burn, allowing generation of a warning to reposition the patient and/or change the scan settings.

15 Claims, 6 Drawing Sheets

BODY SHAPE ESTIMATION FROM LOCALIZER SCAN IN MAGNETIC RESONANCE MEDICAL IMAGING

BACKGROUND

Patient contact protection is an important issue for MR imagining. Magnetic resonance (MR) imaging generates a signal using radio-frequency (RF) pulses. Normally, the radiofrequency power (aka SAR) to be applied to patient tissue during MR scanning is derived based on a patient's body weight. However, if the patient's body parts, such as arms, are too close to the MRI bore housing, too much SAR may be applied to the patient tissue and cause MRI burn injuries due to heat conduction or direct skin contact with the housing.

Normally, the technician screens and monitors the patient before and during the MR examination to limit burn risk due to arm position. The SAR may be set to the minimum to prevent any potential risk of MR burn injuries, but then the examination will take longer. A protective pad positioned between patient and bore may prevent direct contact but may be uncomfortable or too warm for the patient. Alternatively, an overhead camera may be used to estimate the patient body shape before the scan. However, this needs additional setup and registration and may not be accurate due to patient body parts being covered by coils or quilts.

SUMMARY

By way of introduction, the preferred embodiments described below include methods, systems, instructions, and non-transitory computer readable media for shape estimation in MR to limit patient burns. A localizer image or scout scan is used to determine some of the patient shape and corresponding position. A missing part, such as the arm not in the scout scan field of view, is inferred from the localizer image. The position of the inferred body part is used to predict the risk of burn, allowing generation of a warning to reposition the patient and/or change the scan settings.

In a first aspect, a method of avoiding a burn is provided in magnetic resonance (MR) scanning. A patient representation of a patient in a MR scanner is acquired from a scout scan. The scout scan for the patient representation has a field of view not including at least a portion of an arm of the patient. A shape corresponding to the portion of the arm not included in the field of view of the scout scan in inferred from the patient representation. A burn risk is estimated from a position of the inferred shape relative to the MR scanner. A notice is generated based on the burn risk.

In a second aspect, a system is provided for estimating body shape of a patient. A MR scanner is configured by settings to perform a localizer scan of the patient. A processor is configured to estimate one or more body parts of the patient not covered by the localizer scan and generate an output based on proximity of the one or more body parts to the MR scanner. An output device configured to respond to the output.

In a third aspect, a method is provided for machine training for body shape estimation. Camera images of patients laying on tables of MR scanners are captured. Localizer images of the patients laying on the tables are acquired by the MR scanners. Ground truth are generated for body shapes of the patients from the camera images. A model is machine trained to estimate at least missing portions of the body shapes from the localizer images. The model as machine trained is stored.

Further aspects are provided as illustrative examples below. Any of the illustrative examples may be used with different of the aspects above.

The present invention is defined by the following claims, and nothing in this section should be taken as a limitation on those claims. Further aspects and advantages of the invention are discussed below in conjunction with the preferred embodiments and may be later claimed independently or in combination.

DETAILED DESCRIPTION

Patient body shape is estimated so the distance of the patient body to the MR bore may be measured to prevent potential burn injuries. The MR localizer imaging is leveraged for patient contact protection. MR localizer images are acquired from very short scans used in MR examination as scout images to localize the anatomical position of the internal organ to be examined. The localizer imaging is not impacted by patient clothes, coils, and quilts. However, the localizer images have a limited field of view such that body parts closer to the bore (e.g., patient arms) may not be visible in the localizer images. A shape completion approach is used to estimate the body shape beyond the field of view of localizer images, allowing for patient contact protection.

In one implementation, patient contact protection is provided in the MR examination. One or more localizer images of the patient with limited field of view are acquired. The patient body shape outside the field of view is inferred. The potential MR burn risk is estimated based on inferred patient body shape and the MR settings. The body shape may be represented as a two-dimensional (2D) binary mask, three-dimensional (3D) binary volume, mesh or surface, segmentation, or another parameterization. The inference may be based on a machine-trained shape completion model based on the observation of the localizer images. For example, the shape completion model is machine trained from the aligned localizer images and ground truth from red, green, blue (RGB) or RGB-depth (RGB-D) images obtained from a 2D or 3D camera.

The localizer images acquired in routine MR examination are leveraged to determine burn risk. The localizer imaging is non-invasive, and no extra hardware setup is needed to acquire the localizer image. The localizer images are not impacted from the patient clothes, coils, and quilt covers, which provides very clean body shape inside the field of view to be used to estimate the body shape outside the field of view.

Figure 1:
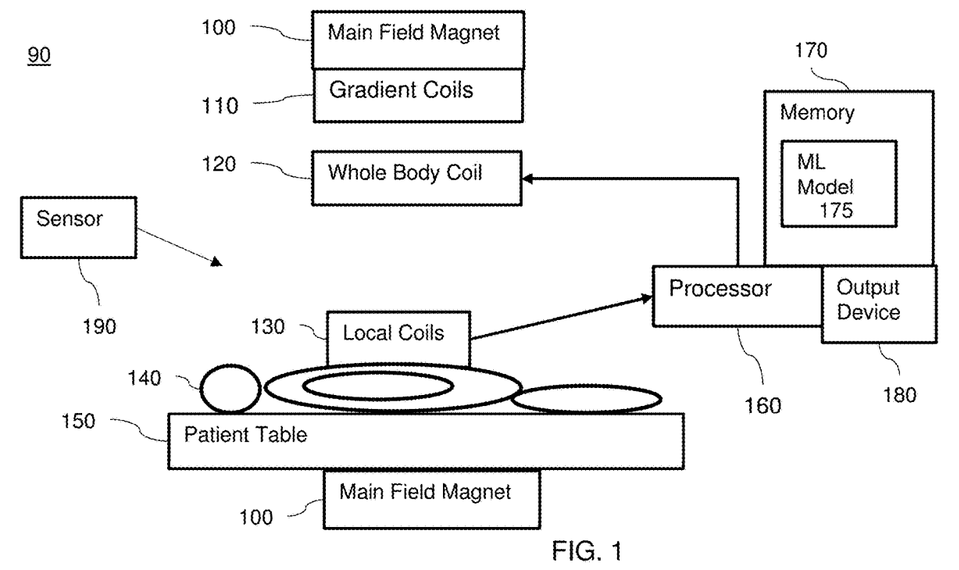
FIG. 1 is a block diagram of an implementation of an MR system for shape inference.

FIG. 1 shows one embodiment of a MR system for MR scanning by an MR scanner 90. This system is used for estimating body shape of a patient to assess burn risk before full or diagnostic MR imaging or scanning. The MR scanner 90 scans a given patient 140. The MR scanner 90 performs the acts of FIG. 2, FIG. 3, or another method. The MR scanner 90 performs one or more scout scans, which are used to assess burn risk using inference, and then performs one or more full or regular diagnostic MR scans.

The MR scanner 90 includes a main field magnet 100, gradient coils 110, whole body coil 120, local coils 130, and/or a patient support (e.g., table) 150. The system includes the MR scanner 90, processor 160, memory 170, and display 180. One or more sensors 190 separate from the coils 110, 120, 130 may be provided, such as where the MR scanner is used to acquire data for machine training rather than just inference. Additional, different, or fewer components may be provided for the MR scanner 90 and/or system. For example, the local coils 130 or the whole-body coil 120 are not used. In another example, the processor 160, memory 170, and display 180 are provided without the coils 100-120 and patient support 150, such as a workstation operating on scan data stored in the memory 170. In yet another example, the processor 160, memory 170, and/or display 180 are part of the MR scanner 90. In another example, the sensor 190 is not provided, such as where the MR scanner 90 is used for inference to assess risk for a patient.

The MR scanner 90 is configured by settings of controls to scan a region of the patient 140. The scan provides scan data in a scan domain. The MR scanner 90 scans the patient 140 to provide raw measurements (measurements in a possibly non-linear frequency domain). Where spatial encoding is Fourier, the scan or raw data may be k-space data. For the scan, the main field magnet 100 creates a static base magnetic field, B0, in the body or part of the body of the patient 140 positioned on the patient support 150. The gradient coils 110 produce position dependent magnetic field gradients superimposed on the static magnetic field. The gradient coils 110 produce position dependent and shimmed magnetic field gradients in three orthogonal directions and generate magnetic field pulse sequences. The whole-body coil 120 and/or the local coils 130 receive radio frequency (RF) transmit pulses, producing magnetic field pulses (B1) that rotate the spins of the protons in the imaged region of the patient 140.

In response to applied RF pulse signals, the whole-body coil 120 and/or local coils 130 receive MR signals, i.e., signals from the excited protons within the body as the protons return to an equilibrium position established by the static and gradient magnetic fields. The MR signals are detected and processed by a detector, providing an MR dataset of raw data. A raw storage array of the memory 170 stores corresponding individual measurements forming the MR dataset.

The MR scanner 90 is configured by the processor 160 to scan. Any of various scanner controls may be set, such as k-space coordinates, TR, TE, flip angle, pulse envelopes, carrier frequencies, timings, durations, and/or raw transmit pulses. A protocol, with or without user input or alteration, may establish the settings, at least initially, used for a particular scan. Any level of generality may be provided for the settings, such as an abstraction of the actual variables used for specific hardware. The memory 170 stores the configuration (e.g., a predetermined pulse sequence of an imaging protocol and a magnetic field gradient and strength data as well as data indicating timing, orientation, and spatial volume of gradient magnetic fields to be applied in scanning) and the resulting raw data or measurements.

This scan plan relies, in part, on the location of the target. The spatial positioning of the scan is located to scan the target. This target location is within a homogenous volume field of view of the MR scanner 90 by the scan plan. By locating the target, the most homogenous field of view of the MR scanner 90 may be positioned at the target for the diagnostic scan. A scout scan is used to localize the target for then performing a diagnostic scan.

The patient support 150 is a flat or contoured slab (e.g., table) on which the patient 140 lies or is supported. In an open bore, the patient support 150 may be formed as a recliner or chair given a larger bore.

The patient support 150 is movable relative to the MR scanner 90 (i.e., the main field magnet 100, gradient coils 110, and whole-body coil 120). A motor (actuator) with gearing, pulleys, and/or other transmission moves the patient support 150 into and out of the bore, such as longitudinally along the bore or patient support 150. Other motion may be provided, such as raising and lowering the patient support 150, moving the patient support 150 laterally (orthogonal to a side of the patient 140 lying on their back), and/or rotating along one, two, or three dimensions. One or more sensors may measure the location of the patient support 150 relative to the MR scanner 90. The patient support 150 with the patient 140 is moved into the more or most homogeneous part of the magnetic field created by the main field magnet.

Using the gradient coils 110, the MR scanner 90 may localize a region of interest or scan region at different locations in a field of view (FoV) of the MR scanner 90. The patient support 150 moves the patient 140 so that the region of interest is within the field of view of the MR scanner 90 to allow localization. The MR scanner 90 then performs one or more scout scans. The scout scan is used to localize an organ or patient region of interest relative to the MR scanner for then performing the diagnostic or full MR scan. The scout scan may have a lesser field of view, such as not being whole body and/or not including parts or all of the arms, legs, and/or head. The field of view, time, and/or resolution used for a scout scan is less than used for the diagnostic scan. The scout scan purpose is to locate the organ or object of interest in the patient, as compared to the diagnostic scan purpose of high-resolution examination for medical diagnosis. MR localizer images acquired from very short scans are generally used in MR examination as scout images to localize the anatomical position of the internal organ to be examined.

The scout scan, after reconstruction, provides one or more MR localizer images used for localization. The localizer imaging is not impacted by patient clothes, coils, and quilts. However, the localizer images have limited field of view such that body parts closer to the bore or housing of the MR scanner 90, such as patient arms, are not visible in the localizer images. These parts are the most likely to have burn risk.

The sensor 190 is one or more sensors. The sensor 190 is provided for machine training. For inference, the sensor 190 is not used and/or is not provided with the MR scanner 90.

The sensor 190 is positioned outside of the bore or MR scanner 90 field of view but may be within the bore. The sensor 190 mounts to the housing of the MR scanner 90, a robotic arm, wall, ceiling, or sensor tree. The sensor 190 is positioned so that the sensor field of view captures all or part of the patient 140 while the patient 140 is within the bore on the table 150. For example, the sensor field of view reaches an exterior part of the patient 140 while the patient 140 is positioned on the patient support 150 where the patient is positioned for MR scanning.

The sensor 190 is a camera as an active or passive sensor. For example, the sensor 190 is a camera for acquiring optical images or a depth camera for acquiring optical images with depth. Infrared cameras or cameras for visual frequencies may be used. Other types of passive sensors may be provided, such as laser rangefinders, radio frequency sensors, or a weight mat sensing weight at different locations on the patient support 150. In an alternative, or additional, example, the sensor 190 is an active sensor, such as an ultrasound scanner that transmits acoustic energy in a steerable way and receives echoes or a camera on a robotic arm that actively moves the camera.

The processor 160 configures the MR scanner 90. The processor 160 is a general processor, digital signal processor, graphics processing unit, application specific integrated circuit, field programmable gate array, artificial intelligence processor, tensor processor, digital circuit, analog circuit, combinations thereof, or another now known or later developed device for operating on raw data, localizing, controlling, and/or applying artificial intelligence. The processor 160 is a single device, a plurality of devices, or a network. For more than one device, parallel or sequential division of processing may be used. Different devices making up the processor 160 may perform different functions, such as configuring the MR scanner 90 to scan by one device and estimating burn risk by another device. In one embodiment, the processor 160 is a control processor or other processor of the MR scanner 90. Other processors of the MR scanner 90 or external to the MR scanner 90 may be used. For example, the processor 160 is part of a workstation, server, or computer for machine training.

The processor 160 is configured by software, firmware, and/or hardware to perform its tasks. The processor 160 operates pursuant to instructions stored on a non-transitory medium (e.g., memory 170) to perform various acts described herein.

The processor 160 is configured by settings to control the MR scanner to scout scan the patient. By configuring the MR scanner 90 with different values of the settings, the patient 140 may be scanned to scout for the target in the patient relative to the MR scanner 90. The MR scanner 90 is configured by the processor 160 to perform the localizer scan of the patient. The processor 160 may be configured to reconstruct an image, slice, and/or volume from the scout scan(s) as a patient representation.

The processor 160 is configured to estimate one or more body parts of the patient not covered by the localizer scan. For example, the processor 160 is configured to estimate with a machine-learned shape completion model 175. Various models may be used, such as a neural network (e.g., fully connected or convolutional neural network). The machine-learned shape completion model 175 was configured by training to estimate the missing or total shape information of the patient in response to input of image data from the localizer scan (e.g., input of the localizer image or a portion thereof). By estimating the position of the missing body parts, the proximity of the patient 140 to the MR scanner 90 may be determined using the localizer image or scout scan. An output based on proximity of the estimated body parts to the MR scanner is generated for burn risk.

Artificial intelligence (AI) may be used to infer missing body part information from the localizer image. The AI may have been trained to extrapolate information outside of a current field of view, allowing the processor 160 to estimate where the patient (e.g., arm) is located on the table 150, within the bore, or relative to the MR scanner.

The machine-learned model 175 is one or more models. Hierarchal, sequential, multi-task, or other machine-learned model arrangements may be used. The machine-learned model 175 is formed from one or more networks and/or another machine-learned architecture (e.g., support vector machine). For example, the machine-learned network is a deep neural network. In another example, the machine-learned network is a neural network of a sequence of transformer and/or attention layers. In one embodiment, the machine-learned model 175 is a shape completion model, such as a Deep signed distance function (SDF) model, occupancy model, or MetaSDF model. Other models may be used, such as an occupancy model machine trained with meta training. Other training, such as optimization based on a loss or reward function (e.g., difference from ground truth), may be used.

The machine learned model 175 is trained by training data (input samples with ground truth). A loss based on output of the model being trained compared to an objective function or ground truth is used in an optimization to train the model. A reward may be used in training, such as rewarding similarity. Any optimization may be used, such as Adam or stochastic gradient descent (SGD). Any loss may be used, such as cross entropy, L1 loss, or L2 loss. Pre-training, cross-training, and/or continuous training may be used. The training data is gathered from a database of examples performed under expert control and/or created using a process or algorithm (e.g., segmentation from camera captures). Ground truth may be curated or created by expert review. Instead, or in addition, the training data may be created by modeling or synthetically created.

The processor 160, using the AI (e.g., machine-learned model 175), is configured to infer the shape of the patient, including the position of parts of the patient not within the field of view of the scout scan. The shape within the field of view is not inferred or may be inferred or segmented as well.

The processor 160 is configured to cause the MR scanner 90 to perform the scan of the diagnostic region based on the determined location of anatomy or object of interest. The localizer image is used to localize as well as for estimation of the patient shape or body parts not in the field of view of the scout scan. The location is used to plan the diagnostic scan, such as establishing a position and/or orientation of the target. The diagnostic scan is performed where the target, as localized, is positioned in the field of view of the MR scanner 90. The estimated body location is used to avoid burning the patient 140 during the diagnostic scan.

The memory 170 is a cache, buffer, RAM, removable media, hard drive, or another computer readable storage medium. Non-volatile computer readable storage media include various types of volatile and nonvolatile storage media.

The memory 170 stores raw data (e.g., scan data), the settings for the controls, the machine-learned model 175, positions, patient shape, patient position, localization, scan plans, protocol settings (values), notice, and/or other data. The memory 170 may alternatively or additionally store instructions for the processor 160. The functions, acts or tasks illustrated in the figures or described herein are executed by the processor 160 in response to one or more sets of instructions stored in or on the non-transitory computer readable storage media of the memory 170. The functions, acts or tasks are independent of the particular type of instructions set, storage media, processor or processing strategy and may be performed by software, hardware, integrated circuits, firmware, micro code, and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU, or system. Because some of the constituent system components and method steps depicted in the accompanying figures may be implemented in software, the actual connections between the system components (or the process steps) may differ depending upon the way the present embodiments are programmed.

The output device 180 is a display screen (e.g., CRT, LCD, plasma, or projector), printer, speaker, haptic feedback, or another device to communicate to a user. The output device 180 is configured, for example, by loading an image to a display plane or buffer and/or playing an audio file. The output device 180 is configured to respond to output generated by the processor 160. A warning, alert, or information is output to cause the patient to move their extremity (e.g., arm) away from the bore of the MR scanner 90 and/or to cause the imaging technician to have the patient move. Where there is risk of burn identified or estimated based on the inferred or estimated position of body parts of the patient from the localizer image, the output is generated to avoid tissue burns during diagnostic MR scanning. Other information than a warning or patient movement instructions may be output, such as instructing different diagnostic scan settings to reduce SAR. Where spacing is sufficient, the output may be to alter the diagnostic MR scan to have greater SAR. The output may be used to automatically configure the diagnostic scan to avoid burns without manual control of the settings.

Figure 2:
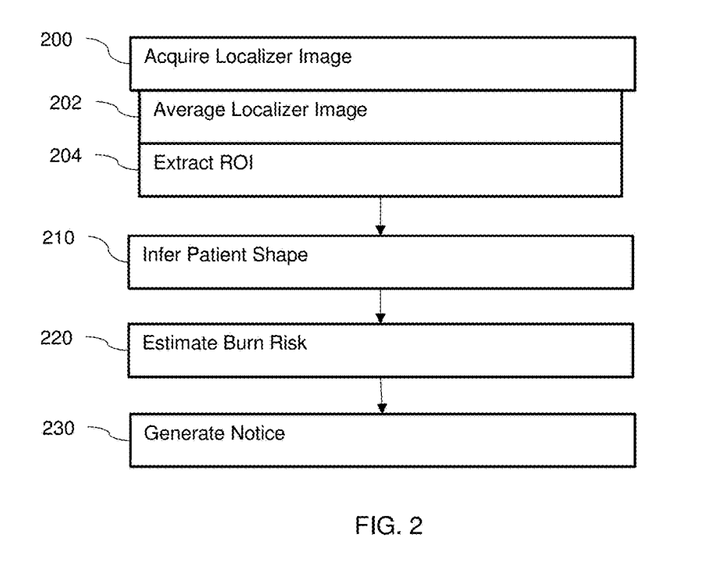
FIG. 2 is a flow chart diagram of one implementation of a method for estimating burn risk from shape inferred, in part, from a localizer image.
Figure 3:
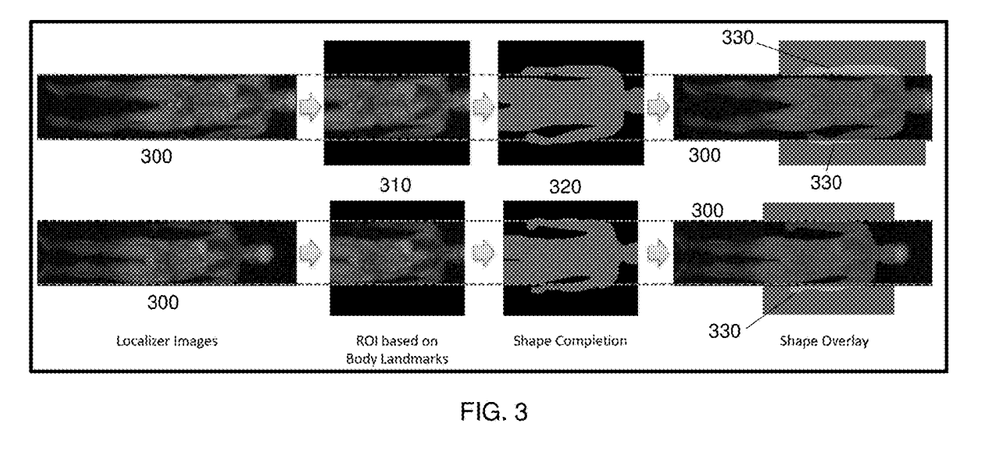
FIG. 3 illustrates two examples of shape inference.

FIG. 2 is a flow chart diagram of an implementation of a method of avoiding a burn in MR scanning. FIG. 3 illustrates one example of the method through to inference of act 210. FIG. 3 illustrates the conceptual workflow of body shape completion from MR localizer imaging. FIG. 2 uses the inferred body shape to estimate burn risk and generate a corresponding notice.

The method is performed by the system of FIG. 1 or another system. A MR scanner acquires in act 200. A processor may process the acquisition in acts 202 and 204, infer in act 210, estimate risk in act 220, and generate the notice in act 230. An output device (e.g., speaker or display screen) generates the notice as an output to the patient, technician, or radiologist. Other components may be used, such as a remote server or a workstation performing the inference of act 210 and/or estimation of act 220.

Various acts may use a machine-learned model (i.e., AI). For example, one or more machine-learned models are used for act 204 (e.g., landmark detection and/or segmentation), and another machine-learned model is used for act 210. During application of the machine-learned model to one or more different patients and corresponding different scan data, the same learned weights or values of the machine-learned model are used. The model and values for the learnable parameters are not changed from one patient to the next, at least over a given time (e.g., weeks, months, or years) or given number of uses (e.g., tens or hundreds). These fixed values and corresponding fixed model are applied sequentially and/or by different processors for different patients. The model may be updated, such as retrained, or replaced but does not learn new values as part of application for a given patient. In other embodiments, continuous learning is used.

The method is performed in the order shown (top to bottom or numerical) or other orders. Additional, different, or fewer acts may be provided. For example, act 202 and/or act 204 are not provided. As another example, act 230 is not provided, such as where the estimated burn risk is used to automatically adjust the diagnostic scan (e.g., adjust SAR). In another example, acts for configuring and performing diagnostic scanning of the patient are included. As yet another example, acts for altering patient position (e.g., manually or through table position) to minimize burn risk are provided.

In act 200, a patient representation of the patient in a MR scanner is acquired from a scout scan. The patient representation is a 2D or 3D representation reconstructed from raw data (e.g., k-space data) acquired by a localizer or scout scan. A stack of slices or images may be reconstructed. A volume may be reconstructed. A single slice or slab may be reconstructed. The localizer imaging is also used or repurposed for shape inference.

The scout scan may have a more limited field of view and/or resolution than a following diagnostic MR scan. For example, the field of view of the scout scan does not include part or all of one or more arms, legs, and/or head of the patient. A MR localizer image is acquired from a short scan (e.g., shorter than the diagnostic scan) and is generally used in MR examination to generate scout or localizer images to localize the anatomical position of the internal organ to be examined. The localizer imaging is not impacted by patient clothes, coils, and quilts but has a limited field of view such that body parts closer to the bore wall are not visible in the localizer images.

The acquired scout scan is used to exactly locate the target anatomy and to plan the diagnosis scan. The processor determines an actual position of the target relative to the MR scanner. For example, a machine-learned model implemented by a processor determines the position of the target relative to the MR system from the scout scan.

The patient representation (e.g., localizer image) is also used for mitigating burn risk. The patient representation reconstructed or formed from the scout scan is used to infer or estimate the location of parts of the patient not represented in the localizer image.

The localizer image may be used as reconstructed or further processed for inferring the location of the unseen anatomy in the localizer image (patient representation). An example of further processing may be segmentation. The skin of the patient is segmented to identify the extremity or outer boundary of the patient in the patient representation. In one approach, a binary representation is formed where every pixel or voxel is labeled as being part of the patient or not. In other approaches, a patient model or digital representation is fit to the patient.

In act 202, the processor averages the patient representation. The patient representation may be of a volume, such as being a volume reconstruction or stack of slices. The patient representation is collapsed as a projection from a top view of the patient laying on the table of the scanner. The values along one dimension are averaged to determine pixel values. The collapsed or projected representation is a 2D representation of the patient from the localizer image. For example, the localizer images are stacked and averaged along the top view projection. FIG. 3 shows localizer images 300 formed as an average projection. Parts of the arms are outside field of view. In other implementations, one of the slices or a 2D representation as reconstructed is used. In yet other implementations, the 3D representation is used without projection.

Instead of operations in 2D, a 3D space is used for a volumetric measurement from the patient skin surface to the MRI bore.

In act 204, the processor extracts a region of interest of the patient representation. The region of interest is extracted from the averaged localizer image or from the localizer image without the averaging. The region of interest of the patient representation is of less of the patient than provided in the field of view of the scout scan. FIG. 3 shows an example. The region of interest 310 is of the upper body (e.g., torso) without part of the legs and/or head. The width is maintained but the region of interest may be a sub-set of the width, depth, and/or length. The region of interest extraction provides for greater standardization for input to the inference despite patient and scout scan variances.

In one implementation, the region of interest is extracted based on landmarks. Landmarks are detected in the patient representation (localizer image). Any landmarks may be used, such as internal and/or external landmarks. For example, a machine-learned model detects joints, such as shoulders, neck, and/or hip joints. The region of interest is extracted to include these joints with a boundary of a default size with different joints defining different boundaries (e.g., shoulders for top and hips for bottom). The region of interest of the upper body is extracted based on body landmark detections.

The localizer image (patient representation) for the region of interest is used to complete the shape of the patient, including one or more parts not represented in the patient representation. For example, FIG. 3 shows the shape completion 320 as a binary pixel representation of the upper body in the patient representation as well as parts (e.g., all or parts of one or more arms) not represented in the patient representation.

In act 210 of FIG. 2, the shape corresponding to the portion or portions of the body (e.g., arm or arms) not included in the field of view of the scout scan is inferred. The patient representation is used to infer the missing shape. The extracted region of interest from the averaged localizer image is used. In other implementations, the extracted region of interest from the localizer image without averaging or the localizer image as averaged or not without extraction of the region of interest is used. In yet other implementations, the localizer image after other processing, such as filtering, landmark detection, body model fitting, and/or segmentation, is used. Any patient representation derived from the localizer image (e.g., scout scan data) is used to infer the missing shape or one or more parts of the patient body not in the field of view of the input representation (pre or post extraction of the region of interest). Other information may be used for inferring as well as the body representation, such a body mass index, weight, height, and/or other clinical information.

Any missing body parts may be inferred. Just one arm, both arms, one leg, both legs, the head, and/or portions thereof are inferred. In the example of FIG. 3, any part of the arms not in the field of view from the scout scan are inferred, as represented by the parts 330 of the arms of the shape completion 320 outside the dashed line representing the boundary of the field of view of the localizer image 300. The inference may infer the body parts or locations within the field of view as well, such as inferring the total shape completion 320. Alternatively, the body within the field of view is extracted by segmentation or a separate process or is not determined at all. Any body parts outside of the field of view are closest to the bore wall, so are the parts of interest in burn risk reduction.

The inference extrapolates the missing shape from the available input (e.g., patient representation). Any extrapolation may be used, such as fitting a body model to the available information and extrapolating from the fit. In one implementation, the processor infers by applying a machine-learned model. The patient representation is input to the machine-learned model, which outputs at least the missing body part shape. An algorithm estimates the missing body parts (e.g., arms) outside the field of view and may apply the inferred body parts back to the projected localizer images (see shape completion 320 of FIG. 3).

Any machine-learned model may be used, such as a neural network. In one implementation, a neural network arranged as an occupancy model is used. Each pixel or voxel is labeled with a binary representation as being part of the patient body or not, including pixels or voxels outside the field of view. In other implementations, a machine-learned models based on a signed distance function is used to infer. For example, a neural network arranged as a deep signed distance function model or a meta signed distance function model is used. Deep and meta are different ways for training the neural network. In yet another implementation, a meta trained occupancy model is used. The meta-trained signed distance function (MetaSDF) model or machine learning method is altered to an occupancy model used to predict the pixel occupancy given the observations from the body shape inside the field of view of the localizer images. Any machine-trained shape completion model that provides one or more missing body parts with or without providing body parts in the field of view may be used.

Figure 4:
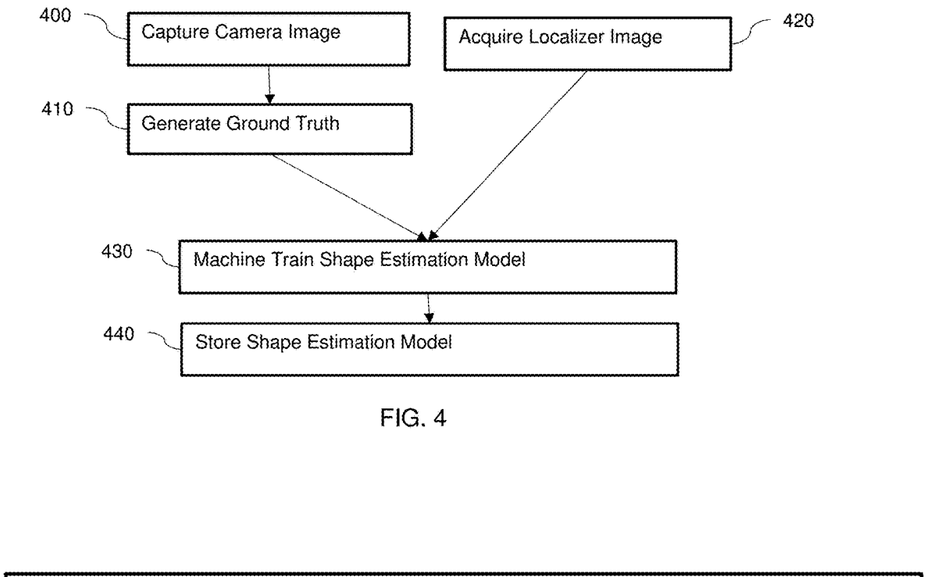
FIG. 4 is a flow chart diagram of an implementation of the method for machine training for shape inference from a localizer image.

The training of the machine-learned model configures the model for inference. Different types of training, models, and/or training data from training may result in different inference. FIG. 4 shows a flow chart of an example method for machine training for body shape estimation. This method trains using localizer images as example inputs aligned with camera images, which are a source of ground truth for the example localizer images. Other training may be used.

A processor, computer, workstation, and/or server performs the acts of FIG. 4. A memory may be used to store the data, such as the captured camera images, acquired localizer images, ground truth, model, values of learnable parameters, loss, reward, and/or other information, used in training. The same or different memory stores the shape estimation model as machine trained.

Additional, different, or fewer acts may be provided. For example, acts for gathering additional inputs for training, such as patient weight, may be included. As another example, the ground truth may be provided based on expert or artist annotation or body model fitting rather than capture of camera images.

The acts are performed in the order shown (top-to-bottom or numerical) or other orders. For example, acts 400 and/or 410 are performed after or simultaneously with act 420.

For training, hundreds, thousands, or more sample inputs and corresponding ground truth outputs are gathered. Unsupervised or semi-supervised training may be used in other implementations. Acts 400, 410, and 420 correspond to gathering the many different samples for optimizing the shape estimation model.

In act 400, cameras capture images of patients. The patients are laying on the tables of MR scanners just before, during, or after acquiring localizer images of those patients with the MR scanners in act 420. While the patients are positioned at the location on the table corresponding to the position the patient will be scanned by the MR scanner, one or more cameras capture an image of the patient. The image is captured from a downward perspective. The perspective for the camera matches or is close to (e.g., within 45 degrees) of the perspective used for the 2D patient representation.

Figure 5:
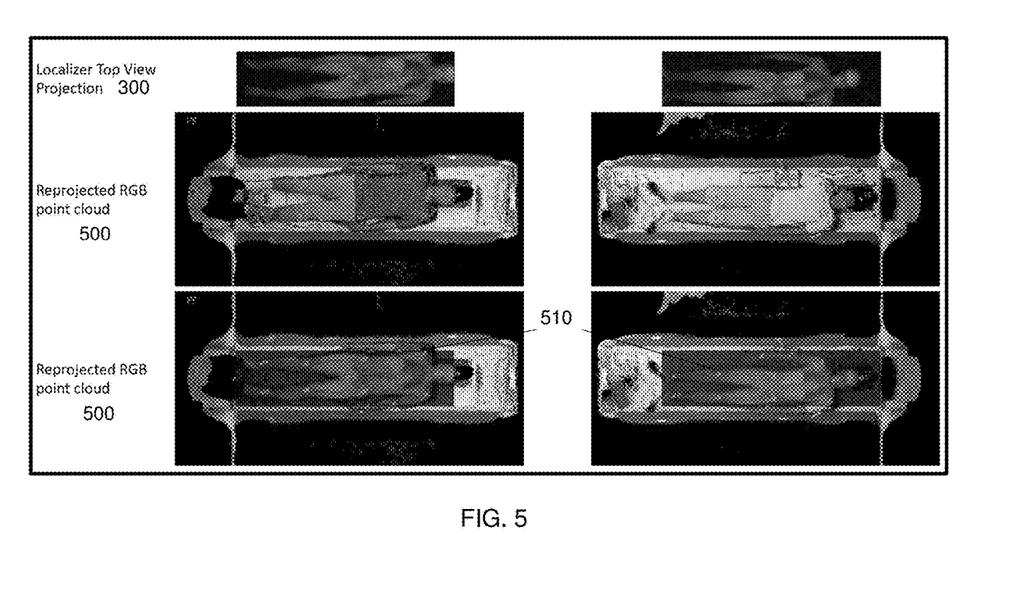
FIGS. 5 and 6 illustrate examples of generating ground truth from aligned camera images.

Any camera may be used, such as an optical (e.g., RGB) camera. In one implementation, the camera is a depth camera, such as RGB-D or 3D camera. To obtain the ground truth for training the model, the camera (e.g., 3D camera) is registered with the MR gantry (e.g., attached to the gantry with calibrated position). Images (e.g., RGB and depth images) are captured in act 400. Due to the registration of the camera relative to the MR scanner, the captured images may be aligned with the corresponding localizer images acquired in act 420. FIG. 5 shows sample localizer images 300 as projections with images 500 of aligned top-view projected localizer images and the top-view projected RGB point cloud, as well as the annotated body landmarks 510 used for training the body landmark detection for region of interest extraction, landmarks for shape inference, and/or to confirm alignment.

The captured images are used to generate the ground truth for the body shapes. The captured images from the camera capture the entire body or the body of the field of view of the localizer image or extracted region of interest. The captured images also include the part or parts of the body of interest missing from the field of view (e.g., arms). Thus, the captured images, such as the RGB point cloud, may be used to show the missing shape (e.g., position and size of body part, such as arms) outside of the field of view of the localizer image. The field of view of the cameras is larger than the field of view of the scout scan, so the captured camera images may be used to generate the ground truth in act 410.

In act 410, the body shapes for the patients and/or for the parts of the body of interest outside the field of view of localizer images are extracted from the camera images. Segmentation, body model fitting, and/or other process may be used to derive the body shape. In one approach, joint segmentation on the localizer image and the RGBD image of each sample is performed. To extract the body shape, the segmentation is performed with pixel value thresholding or a machine-learned segmentation model (e.g., trained to segment within the field of view of the input image using manual annotations as ground truth). The segments from the localizer and camera images indicate the aligned parts of the body within the field of view of the scout scan, and the segment from the camera image shows the part of the body outside the field of view of the scout scan (i.e., the ground truth). In other implementations, just the camera images are segmented.

Figure 6:
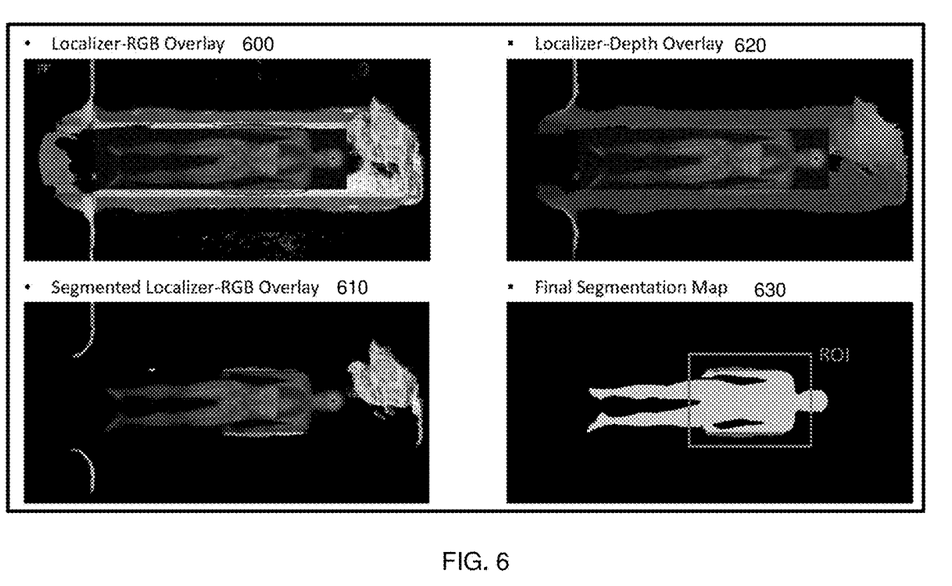

FIG. 6 shows one example implementation. The localizer image and RGB are aligned or overlaid as shown at 600. Alternatively, or in addition, the localizer image and depth point cloud are aligned or overlaid as shown at 620. The image at 610 shows a segmentation of the localizer image and the overlaid segmentation from the RGB image at 610. The brighter white at the arms is the segmentation from the camera image not included in the segmentation of the localizer image. A binary mask with low pass filtering is applied to identify the locations in the 2D segmentations corresponding to the patient, resulting in a final segmentation map 630. The final segmentation map 630 of this example shows the entire body of the patient but may only show the upper torso and arms (see ROI box) or another sub-set of the whole in other implementations. The body shape of the region of interest or the whole body is used as the ground truth. Alternatively, the parts of the body shape outside the field of view of the scout scan but within the region of interest are used as the ground truth.

In act 420, the MR scanners acquire the localizer images. Scout scans are performed on the patients. The resulting scan data is reconstructed to form the localizer images as patient representations (sample inputs used for inference). Any of the processing to be used in inference may be performed, such as projecting (averaging along a dimension) and extraction of the region of interest. The resulting patient representations are then available as input samples, for which corresponding ground truths are created from the camera images.

In act 430, a processor (e.g., computer, server, workstation, tensor processor, or graphics processing unit) machine trains a model to estimate at least missing portions of the body shapes of the scout scan field of view from the localizer images. The model, such as an occupancy model or other neural network, includes an arrangement or architecture with nodes and/or layers defined by various variables. Some or all the variables are learnable parameters. An optimization is performed using the training data (i.e., sample inputs and corresponding ground truths) to learn the values of the learnable parameters that best result in the ground truth outputs given the inputs across the set of training data. Any of various optimizations or learning approaches may be used, such as deep or meta learning. Adam optimization may be used. The optimization relies on a loss representing a difference of the output from the model in response to input of the sample to the ground truth. Any of various loss functions may be used, such as signed distance, L1 norm, L2 (MSE) norm, or others.

In one implementation, meta training is performed on the neural network model for binary prediction location-by-location (e.g., pixel or voxel) of occupancy by the patient. The occupancy of locations outside the field of view of the scout scan input are inferred by the model in response to input of the patient representation sample. In another implementation, a MetaSDF or DeepSDF model learns the body shape. Through machine training, the model learns to estimate the body shape outside the field of view of the scout scan from the body shape or image representing inside the field of view of localizer images.

Figure 7:
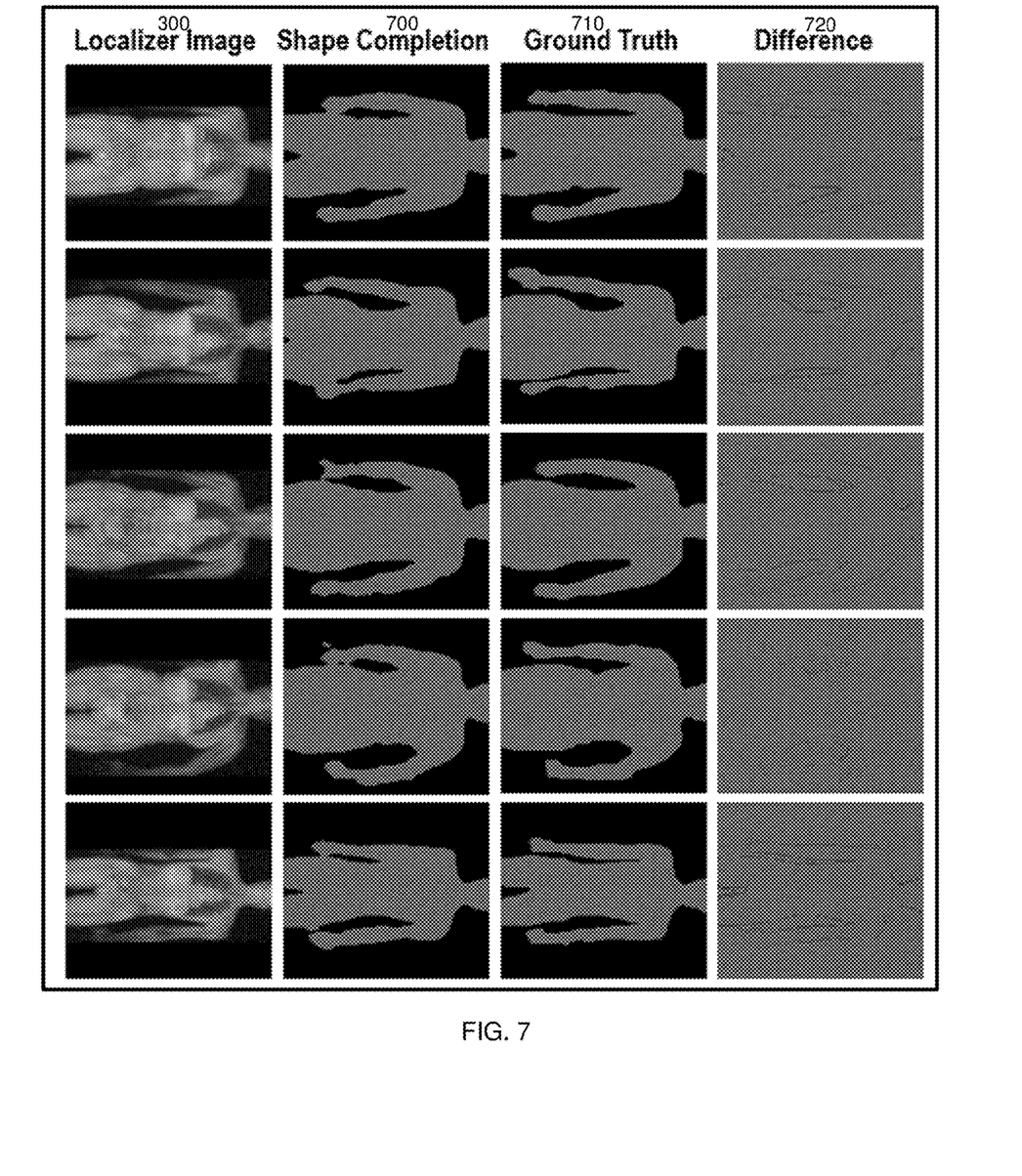
FIG. 7 illustrates examples of different ground truths and corresponding localizer images.

FIG. 7 shows samples of the shape completion results after training of the model. Five different sample input localizer images 300 are shown in five rows. The shape completion outputs of the machine-learned model using meta training for occupancy are shown for these five inputs at 700. The corresponding ground truth from the camera images are shown at 710. The differences between the ground truth 710 and model inferred shape completion 700 is shown at 720. This difference may be used in training to adjust learnable parameters. For inference (i.e., testing or use phase for actual patients), the shape completion 700 is used without the ground truth 710 or difference 720.

In act 440 of FIG. 4, the model as machine trained is stored. Upon completion of the training, the model including the learned values of the learnable parameters is established. This model with the learned values is stored in a memory. Copies may be distributed for use at different locations, by different medical institutions, and/or for different patients. The stored copies may then be used to infer the shape (i.e., find the location of parts of patients outside of the fields of view of the corresponding localizer scans) in act 210 of FIG. 2.

For inference in the example of FIG. 3, the inferred shape completion 320 is overlaid on the localizer image 300, providing the inferred parts of the body of the patient outside the field of view as the shapes 330. For inference, the overlay may not be provided. Instead, the shape completion 320 and/or parts 330 outside the field of view as aligned to the localizer image are used.

In act 220 of FIG. 2, the processor estimates a burn risk from a position of the inferred shape relative to the MR scanner. Since the inferred body part or parts outside the field of view of the scout scan is closest to the bore wall, the burn risk is estimated based on the position of the inferred body part or part missing from the localizer image (i.e., patient representation).

The burn risk is estimated by proximity. The distance of the shape as positioned to a side or wall of the bore indicates the risk of burn. A distance threshold may be used. The closest point of the patient to the bore is determined. The distance at this point is compared to the threshold or thresholds to assess the risk of burn.

Figure 8:
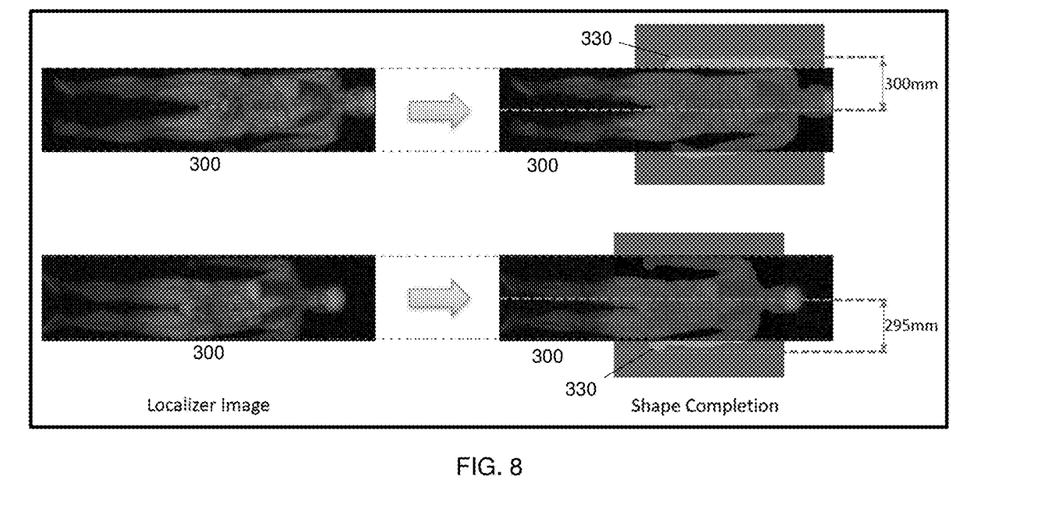
FIG. 8 illustrates estimation of burn risk from inferred shape.

FIG. 8 shows one example. The inferred body part (i.e., arm) 330 is furthest from the center of the localizer image 300. The center of the localizer image 300 corresponds to a center of the bore of the MR scanner. The edge (outer boundary) of the body shape furthest from this center line is found. In the upper example, the distance from the center to the furthest part is 300 mm. In the lower example, the distance from the center to the furthest part is 295 mm. The burn risk threshold may be based on this distance. The further from the center represents greater burn risk. Alternatively, the difference of the distance from the center to a radius of the bore is used. The threshold is applied to this difference, where the smaller the difference represents greater burn risk. Any measure comparing the size of the bore to the patient position within the bore relative to the walls may be used. With the completed body shape overlaid on top of the original localizer image, a measurement of the patient's extremity distance from the bore is made, and the potential risk of MRI burn injury is estimated from the measurement.

A single threshold may be used, representing a binary burn risk (e.g., high risk and low risk). A hierarchy of thresholds may be used, such as providing for three or more different levels of burn risk.

The diagnostic MR scan to be performed is not accounted for in the burn risk. Proximity alone is used. In other approaches, the diagnostic MR scan is used in the estimation of burn risk. Different diagnostic MR scans have different SAR. The MR scan settings and proximity may be used together to estimate burn risk. A given proximity may be a burn risk for one type of diagnostic MR scan and not for another. Different thresholds may be provided for different types of diagnostic MR scans.

In act 230, the processor generates and outputs a notice on an output device. The notice communicates the burn risk and/or a solution (movement of the patient and/or change of MR scan settings) to the radiologist, technician, and/or patient. An audio and/or visual warning, such as a warning light or image showing the part at risk, is output. The level of risk and/or mitigation are output.

The notice is based on the burn risk. The notice may indicate the burn risk. The notice may be generated only for greater burn risk or burn risk at a level where the patient is to be moved and/or the MR scan settings changed.

Once the burn risk is reduced, such as by moving the patient and/or changing MR scan settings for the diagnostic MR scan, the patient is scanned. The diagnostic MR scan is performed. For the diagnostic scan, the MR scanner scans the patient. The scan is guided by a protocol, which establishes values for settings or control of the scanning. A pulse sequence (i.e., plurality of pulses from one or more coils) is created based on the configuration of the MR scanner (e.g., the imaging protocol selected and any adjusted settings). The pulse sequence is transmitted from coils into the patient. The resulting responses are measured by receiving radio frequency signals at the same or different coils. The scanning results in raw measurements as the scan data. The scan data is reconstructed into images for diagnosis.

The protocol is for a medical test. The protocol is designed to provide scan data that may be used to reach a clinical finding. The scan data may be used to diagnose or answer a diagnostic question, such as whether more detailed scanning is needed, whether cancer exists in the organ, or a stage of cancer. The patient is referred to MR scanning for the clinical finding. For a given MR examination, the patient is positioned, the scan localized and burn risk assessed by a scout scan, and then the patient is diagnostically scanned to find the clinical finding. The MR scanning continues over a period of seconds or minutes to acquire the scan data to answer the diagnostic questions. A diagnostic MR image may be generated for analysis by a physician (e.g., radiologist). The patient is less likely to receive a burn in diagnostic MR imaging due risk check and/or alteration from the inference and estimation of burn risk based on the localizer image.

Below are illustrative examples. Examples of different of types (method, system, and non-transitory computer readable medium) may be used in other types. Different combinations of the examples may be provided.

In illustrative example 1, a method of avoiding a burn in magnetic resonance (MR) scanning is provided. A patient representation of a patient in a MR scanner is acquired from a scout scan. The scout scan for the patient representation has a field of view not including at least a portion of an arm of the patient. A shape corresponding to the portion of the arm not included in the field of view of the scout scan is inferred from the patient representation. A burn risk is estimated from a position of the inferred shape relative to the MR scanner. A notice is generated based on the burn risk.

In illustrative example 2, the method of illustrative example 1 further comprises averaging the patient representation as a projection from a top view of the patient laying on a table of the MR scanner. The inferring is from the averaged patient representation.

In illustrative example 3, the method of any of illustrative examples 1-2 further comprises extracting a region of interest of the patient representation. The inference is from the extracted region of interest.

In illustrative example 4, the method of illustrative example 3 is provided, wherein extracting comprises detecting landmarks from the patient representation and extracting the region of interest based on the detected landmarks.

In illustrative example 5, the method of any of illustrative examples 1~4 is provided, wherein extracting the region of interest comprises extracting the region of interest as an upper body of the patient.

In illustrative example 6, the method of any of illustrative examples 1-5 is provided, wherein inferring comprises inferring missing body parts including the at least the portion of the arm, and wherein estimating the burn risk comprises estimating for the missing body parts.

In illustrative example 7, the method of any of illustrative examples 1-6 is provided, wherein inferring comprises inferring by a machine-learned model.

In illustrative example 8, the method of illustrative example 7 is provided, wherein inferring by the machine-learned model comprises inferring by the machine-learned model comprising a deep signed distance function model, an occupancy model, or a meta signed distance function model.

In illustrative example 9, the method of illustrative example 7 is provided, wherein inferring by the machine-learned model comprises inferring by the machine-learned model comprising an occupancy model trained using meta.

In illustrative example 10, the method of any of illustrative examples 7-9 is provided, wherein inferring by the machine-learned model comprises inferring by a machine-trained shape completion model.

In illustrative example 11, the method of illustrative example 10 is provided, wherein inferring by the machine-trained shape completion model comprises inferring where the machine-trained shape completion model was trained using localizer images aligned with camera images, the camera images being a source of ground truth for the localizer images.

In illustrative example 12, the method of any of illustrative examples 1-11 is provided, wherein acquiring comprises acquiring the patient representation as a two- or three-dimensional binary representation.

In illustrative example 13, the method of any of illustrative examples 1-12 is provided, wherein estimating the burn risk comprises measuring a distance from a center of the patient representation corresponding to a center of a bore of the MR scanner to a further extent of an edge of the inferred shape and estimating the burn risk from the distance as compared to a size of the bore.

In illustrative example 14, the method of any of illustrative examples 1-13 is provided, wherein estimating the burn risk comprises estimating from a proximity of the shape at the position to a side of a bore of the MR scanner and MR scan settings for scanning the patient.

In illustrative example 15, the method of any of illustrative examples 1-14 is provided, wherein generating the notice comprises generating the notice as a visual or audio warning of the burn risk.

In illustrative example 16, a system is provided for estimating body shape of a patient. A magnetic resonance (MR) scanner is configured by settings to perform a localizer scan of the patient. A processor is configured to estimate one or more body parts of the patient not covered by the localizer scan and generate an output based on proximity of the one or more body parts to the MR scanner. An output device is configured to respond to the output.

In illustrative example 17, the system of illustrative example 16 is provided, wherein the processor is configured to estimate with a machine-learned shape completion model comprising a neural network, the machine-learned shape completion model configured to estimate in response to input of image data from the localizer scan.

In illustrative example 18, the system of any of illustrative examples 16-17 is provided, wherein the output device comprises a display screen or a speaker.

In illustrative example 19, a method is provided for machine training for body shape estimation. Camera images of patients laying on tables of MR scanners are captured. Localizer images of the patients laying on the tables by the MR scanners are acquired. Ground truth for body shapes of the patients from the camera images. A model is machine trained to estimate at least missing portions of the body shapes from the localizer images, and the model as machine trained is stored.

In illustrative example 20, the method of illustrative example 19 is provided, wherein machine training comprises meta training the model for binary prediction location-by-location of occupancy by the patient, the model comprising a neural network.

Although the subject matter has been described in terms of exemplary embodiments, it is not limited thereto. Rather, the appended claims should be construed broadly, to include other variants and embodiments, which can be made by those skilled in the art.

What is claimed is:

1. A method of avoiding a burn in magnetic resonance (MR) scanning, the method comprising:
   acquiring a patient representation of a patient in a MR scanner from a scout scan, the scout scan for the patient representation having a field of view not including at least a portion of an arm of the patient;
   inferring a shape corresponding to the portion of the arm not included in the field of view of the scout scan, the inferring being from the patient representation;
   estimating a burn risk from a position of the inferred shape relative to the MR scanner; and
   generating a notice based on the burn risk.

2. The method of claim 1, further comprising averaging the patient representation as a projection from a top view of the patient laying on a table of the MR scanner, and wherein inferring comprises inferring from the averaged patient representation.

3. The method of claim 1, further comprising extracting a region of interest of the patient representation, and wherein inferring comprises inferring from the extracted region of interest.

4. The method of claim 3, wherein extracting comprises detecting landmarks from the patient representation and extracting the region of interest based on the detected landmarks.

5. The method of claim 3, wherein extracting the region of interest comprises extracting the region of interest as an upper body of the patient.

6. The method of claim 1, wherein inferring comprises inferring missing body parts including the at least the portion of the arm, and wherein estimating the burn risk comprises estimating for the missing body parts.

7. The method of claim 1, wherein inferring comprises inferring by a machine-learned model.

8. The method of claim 7, wherein inferring by the machine-learned model comprises inferring by the machine-learned model comprising a deep signed distance function model, an occupancy model, or a meta-learning-based signed distance function model.

9. The method of claim 7, wherein inferring by the machine-learned model comprises inferring by the machine-learned model comprising an occupancy model trained using meta learning.

10. The method of claim 7, wherein inferring by the machine-learned model comprises inferring by a machine-trained shape completion model.

11. The method of claim 10, wherein inferring by the machine-trained shape completion model comprises inferring where the machine-trained shape completion model was trained using localizer images aligned with camera images, the camera images being a source of ground truth for the localizer images.

12. The method of claim 1, wherein acquiring comprises acquiring the patient representation as a two- or three-dimensional binary representation.

13. The method of claim 1, wherein estimating the burn risk comprises measuring a distance from a center of the patient representation corresponding to a center of a bore of the MR scanner to a further extent of an edge of the inferred shape and estimating the burn risk from the distance as compared to a size of the bore.

14. The method of claim 1, wherein estimating the burn risk comprises estimating from a proximity of the shape at the position to a side of a bore of the MR scanner and MR scan settings for scanning the patient.

15. The method of claim 1, wherein generating the notice comprises generating the notice as a visual or audio warning of the burn risk.

* * * * *